US006700934B2

(12) United States Patent
Lin

(10) Patent No.: US 6,700,934 B2
(45) Date of Patent: Mar. 2, 2004

(54) ERROR DETECTION USING A MAXIMUM DISTANCE AMONG FOUR BLOCK-MOTION-VECTORS IN A MACROBLOCK IN A CORRUPTED MPEG-4 BITSTREAM

(75) Inventor: Tao Lin, Fremont, CA (US)

(73) Assignee: Redrock Semiconductor, Ltd., Sunnyvale, CA (US)

(*) Notice: Subject to any disclaimer, the term of this patent is extended or adjusted under 35 U.S.C. 154(b) by 253 days.

(21) Appl. No.: 09/681,299

(22) Filed: Mar. 14, 2001

(65) Prior Publication Data

US 2002/0131510 A1 Sep. 19, 2002

(51) Int. Cl.[7] .............................................. H04N 7/18
(52) U.S. Cl. .............................. 375/240.16; 375/240.17
(58) Field of Search ......................... 375/240.08–240.17

(56) References Cited

U.S. PATENT DOCUMENTS

| 5,455,629 A | 10/1995 | Sun et al. ................... 348/466 |
| 5,577,130 A | 11/1996 | Wu ............................. 382/106 |
| 5,867,591 A | 2/1999 | Onda ......................... 382/154 |
| 5,894,526 A | 4/1999 | Watanabe et al. ........... 382/236 |
| 5,946,042 A | 8/1999 | Kato .......................... 348/416 |
| 6,178,266 B1 | 1/2001 | Kondo et al. ............... 382/239 |
| 6,229,854 B1 * | 5/2001 | Kikuchi et al. ........ 375/240.27 |
| 6,275,532 B1 * | 8/2001 | Hibi et al. ............. 375/240.17 |
| 6,307,970 B1 * | 10/2001 | Schuyler et al. ............ 382/236 |
| 6,400,763 B1 * | 6/2002 | Wee ....................... 375/240.16 |
| 6,483,874 B1 * | 11/2002 | Panusopone et al. .. 375/240.08 |

OTHER PUBLICATIONS

Fukunage et al., "MPEG–4 Video Verification Model version 13.3", ISO/IEC JTC1/SC29/WG11, MPEG99/4960. 10/99, pp. 1–18,75–80,105,115–140,160–193.

* cited by examiner

*Primary Examiner*—Andy Rao
(74) *Attorney, Agent, or Firm*—Stuart T. Auvinen

(57) ABSTRACT

Errors are detected in a motion-picture-experts group (MPEG) bitstream that has been corrupted by wireless transmission. Some 16×16 pixel macroblocks are divided into four smaller 8×8 blocks. A motion vector is encoded for each block. The Euclid distance is generated for each possible pair of the four motion vectors, and the maximum of these distances is compared to a threshold distance. When the maximum distance among the motion vectors in a macroblock exceeds the threshold, a bitstream error is signaled and error concealment is triggered. Since the four blocks within a macroblock usually stay close to each other in adjacent video frames, large jumps in the relative location of one block usually indicate a bitstream error. Squares of the distances can be generated and compared to reduce the computational load by eliminating square-root operations.

20 Claims, 7 Drawing Sheets

PRIOR ART   FIG. 1

ERROR DETECTION USING A MAXIMUM DISTANCE AMONG FOUR BLOCK-MOTION-VECTORS IN A MACROBLOCK IN A CORRUPTED MPEG-4 BITSTREAM

BACKGROUND OF INVENTION

This invention relates to video compression systems, and more particularly to error detection in macroblock motion vectors.

Delivery of video over wireless networks is receiving much interest as a key application for future wireless and handheld devices. For several years now, personal computers (PC's) and various other computing devices have delivered video to users over the Internet. However, processing of video bitstreams or feeds is quite data-intensive. Limited communication-line bandwidth can reduce the quality of Internet video, which is often delivered in small on-screen windows with jerky movement.

To mitigate the problems of large video streams, various video-compression techniques have been deployed. Compression standards, such as those developed by the motion-picture-experts group (MPEG), have been widely adopted. These compression techniques are lossy techniques, since some of the picture information is discarded to increase the compression ratio. However, compression ratios of 99% or more have been achieved with minimal noticeable picture degradation.

Portable hand-held devices such as personal-digital-assistants and cellular telephones are widely seen today. Wireless services allow these devices to access data networks and even view portions of web pages. Currently the limited bandwidth of these wireless networks limits the web viewing experience to mostly text-based portions of web pages. However, future wireless networks are being planned that should have much higher data transmission rates, allowing graphics and even video to be transmitted to portable computing and communication devices.

Although proponents of these next-generation wireless networks believe that bandwidths will be high enough for high-quality video streams, the inventors realize that the actual data rates delivered by wireless networks can be significantly lower than theoretical maximum rates, and can vary with conditions and local interference. Due to its high data requirements, video is likely to be the most sensitive service to any reduced data rates. Interference can cause intermittent dropped data over the wireless networks. Errors in the bitstream are likely to be common.

Next-generation compression standards have been developed for transmitting video over such wireless networks. The MPEG-4 standard provides a more robust compression technique for transmission over wireless networks. Recovery can occur when parts of the MPEG-4 bitstream is corrupted. However, the MPEG standard does not specify exactly how to detect errors. Devices may differ in their ability to detect and correct bitstream errors.

FIG. 1 highlights video compression using a motion vector for a macroblock. When a video stream is compressed prior to transmission, each frame or video object plane (VOP) of the video stream is divided into rectangular regions known as macroblocks. Each macroblock is 16 by 16 pixels in size, so a 160×160 frame has 100 macroblocks.

While some macroblocks in some frames may be encoded simply by transmitting the 256 pixels in each macroblock, compression occurs when the same image in a macroblock can be found in 2 or more frames. Since video typically has 2 or more frames per second, movement of image objects is usually slow enough that similar images or macroblocks can be found in several successive frames, although with some movement or change. Rather than re-transmit all 256 pixels in a macroblock, only the changed pixels in the macroblock can be transmitted, along with a motion vector that indicates the movement of the macroblock from frame to frame. The amount of data in the bitstream is reduced since most of the macroblock's pixels are not re-transmitted for each frame.

In FIG. 1, macroblock 16' is a 16×16 pixel region of a first video object plane 10. All 256 pixels in macroblock 16' are transmitted in the bitstream for first video object plane 10. In next video object plane 12, the same image as in macroblock 16' appears, but in a different position in the frame. The same image in macroblock 16 in video object plane 12 is offset from the original location of macroblock 16' in first video object plane 10. The amount and direction of the offset is known as motion vector 20.

Rather than transmit all 256 pixels in macroblock 16, motion vector 20 is encoded into the bitstream. Since one vector replaces 256 pixels, a significant amount of data compression occurs. The same image in macroblock 16 may also be found in successive video object planes, and motion vectors can be encoded for these video object planes, further increasing compression.

During compression, a search can be made of all pixels in first VOP 10 within a certain range of the position of macroblock 16. The closest match in first video object plane 10 is selected as macroblock 16' and the difference in location is calculated as motion vector 20. When the image in macroblock 16 differs somewhat from the original image in original macroblock 16', the differences can be encoded and transmitted, allowing macroblock 16 to be generated from original macroblock 16'.

The receiver that receives the encoded bitstream performs decoding rather than encoding. Motion vectors and error terms for each macroblock are extracted from the bitstream and used to move and adjust macroblocks from earlier video object planes in the bitstream. This decoding process is known as motion compensation since the movement of macroblocks is compensated for.

FIG. 2 shows that each macroblock can be divided into 4 smaller blocks. The MPEG-4 standard allows for a finer resolution of motion compensation. A 16×16 macroblock 16 can be further divided into 4 blocks 22, 23, 24, 25. Each block 22, 23, 24, 25 has 8×8, or 64 pixels, which is one-quarter the size of macroblock 16.

FIG. 3 shows that separate motion vectors can be encoded for each of the 4 blocks in a macroblock. When the image in a macroblock remains intact, a single motion vector may be encoded for the entire macroblock. However, when the image itself changes, smaller size blocks can often better match the parts of the image.

A macroblock 16 contains four smaller images in blocks 22, 23, 24, 25. In current video object plane 12, these images occur within a single macroblock 16. However, in the previous or first video object plane 10, these images were separated and have moved by different amounts, so that the images merge together toward one another and now all fit within a single 16×16 pixel area of second video object plane 12. The images of blocks 22, 23, 24, 25 have become less fragmented in second video object plane 12.

During encoding, four motion vectors 26, 27, 28, 29 are separately generated for each of blocks 22, 23, 24, 25 respectively. This allows each block to move by a different amount, whereas when only one motion vector is used for all 4 blocks in a macroblock, all blocks must move by the same amount. In this example, block 25' has shifted more to the left than other blocks 22', 23', 24'. Motion vector 29 is slightly larger than the other motion vectors 26, 27, 28. Better accuracy can be achieved when block-level motion vectors are used with a macroblock, at the expense of more data (four motion vectors instead of one). Of course, not all macroblocks need to be encoded with four motion vectors, and the encoder can decide when to use block-level motion compensation.

FIG. 4 is a flowchart of block- and macroblock-level motion compensation during decoding. The decoder parses the bitstream for each new macroblock, step 70. The number of motion vectors for the block is read, step 72. When only one motion vector is encoded for the macroblock, the pixels in the macroblock are fetched from memory that contains the original macroblock in the previous video object plane, step 74. Motion compensation is then performed, step 76, by shifting the x,y location of each of the 256 pixels in the original macroblock by the motion vector to determine the new pixel locations in the current video object plane. The next macroblock can then be parsed.

When four motion vectors are found in the macroblock, step 72, then the four 8x8 blocks are fetched from memory that contains the pixels in the previous video object plane, step 78. Motion compensation is then separately performed on each of the 4 blocks, step 76. The x,y location of each of the 64 pixels in the original block is shifted by the motion vector for that block to determine the new pixel locations in the current video object plane. Each of the four blocks is shifted by its own motion vector. The next macroblock can then be parsed.

While such block-level motion compensation is useful, errors can still occur in the bitstream, especially when the bitstream is transmitted over a wireless network. What is desired is a method to detect errors in the bitstream. An intelligent error detector is desired that check the motion vectors.

DETAILED DESCRIPTION

The present invention relates to an improvement in error detection for compressed video bitstreams. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the four blocks within a macroblock should normally stay close to one another, since video images change slowly from frame to frame. When one of the motion vectors is much different from the other 3 motion vectors for blocks in a macroblock, it is likely that an error has occurred in the bitstream. The inventor thus uses the block-level motion vectors as a way of detecting bitstream errors.

Figure 1:
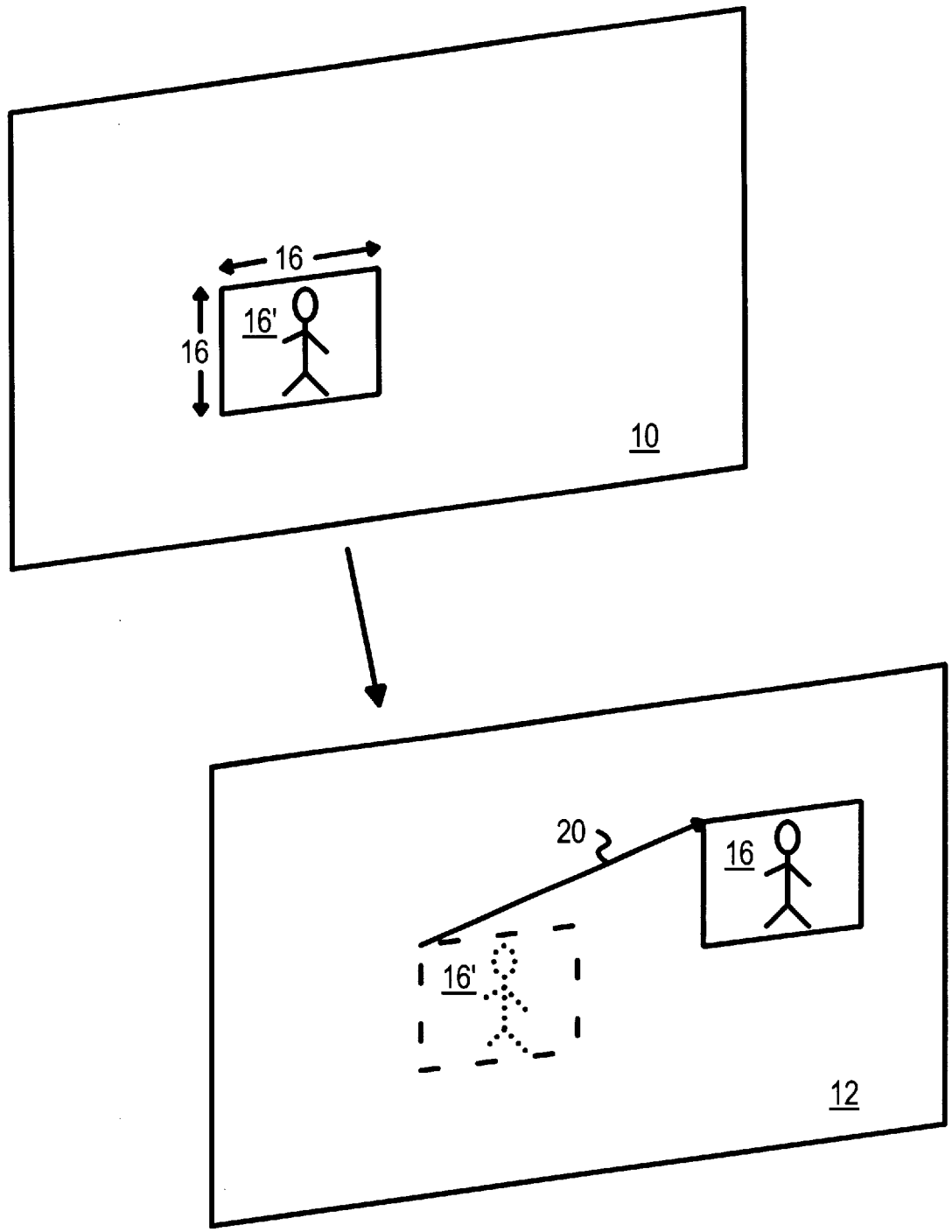
FIG. 1 highlights video compression using a motion vector for a macroblock.
Figure 2:
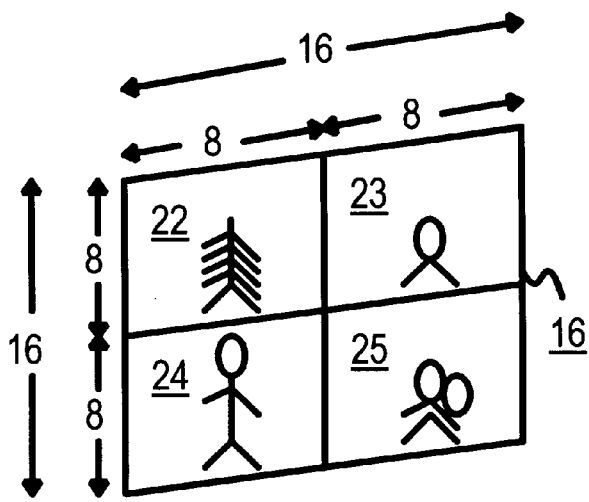
FIG. 2 shows that each macroblock can be divided into 4 smaller blocks.
Figure 3:
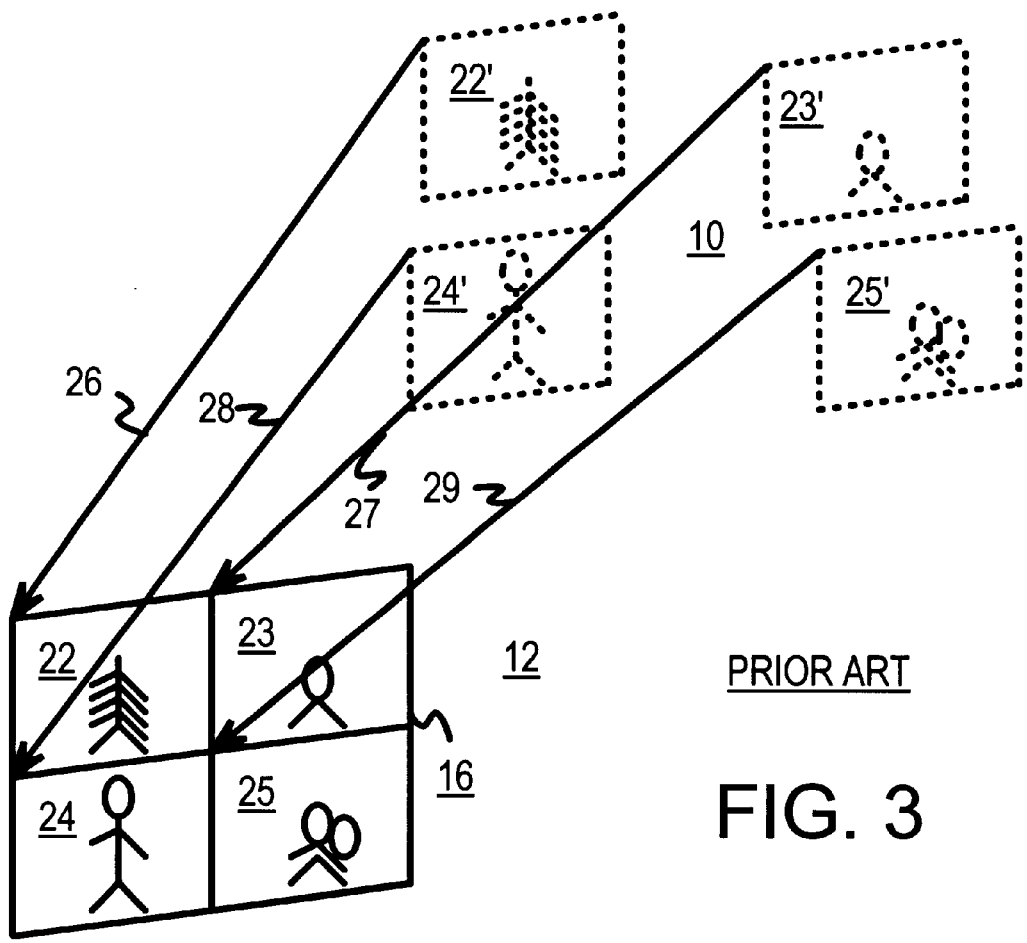
FIG. 3 shows that separate motion vectors can be encoded for each of the 4 blocks in a macroblock.
Figure 4:
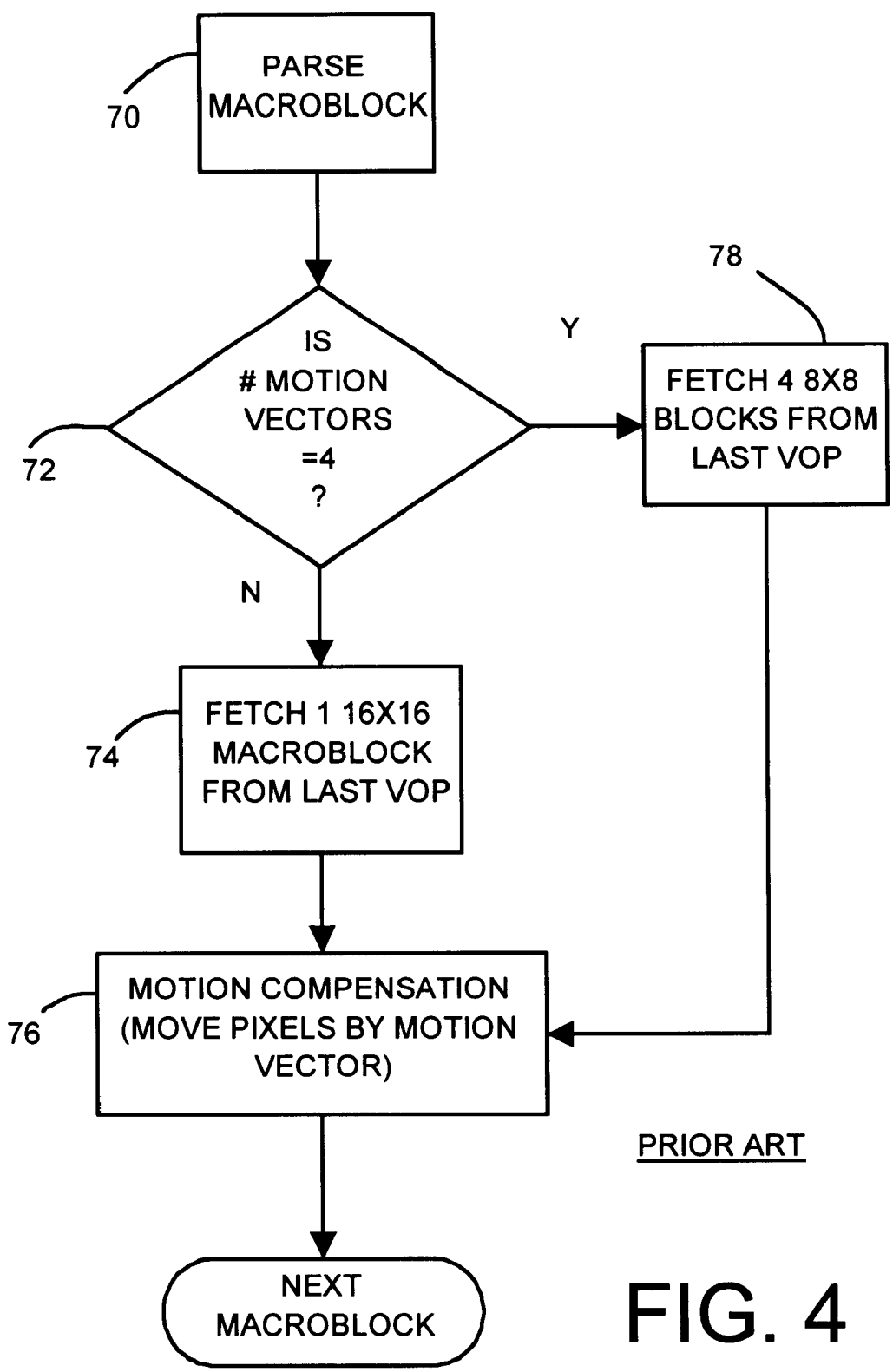
FIG. 4 is a flowchart of block- and macroblock-level motion compensation during decoding.
Figure 5:
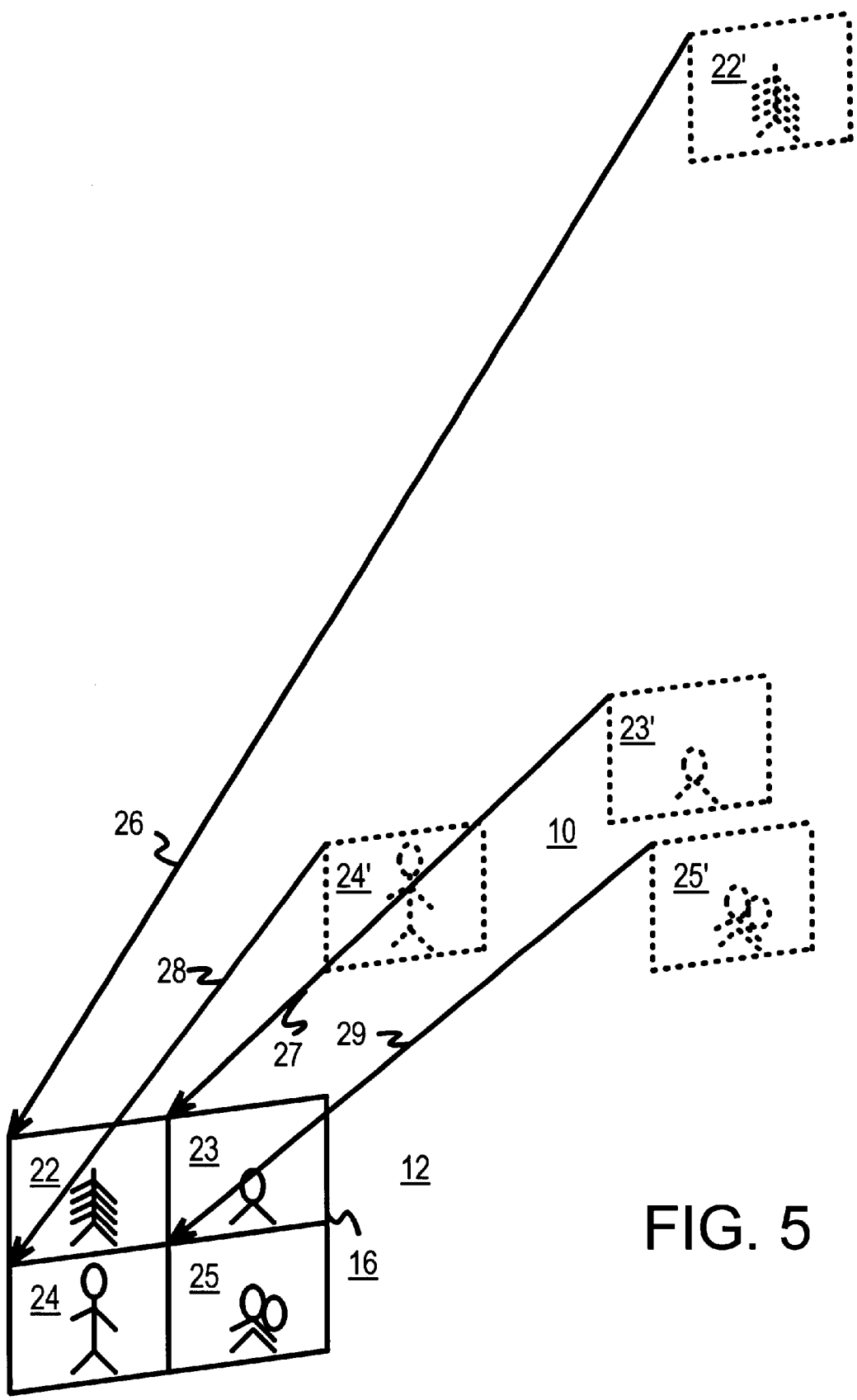
FIG. 5 illustrates a bitstream error detected by an abnormally larger motion vector.

FIG. 5 illustrates a bitstream error detected by an abnormally larger motion vector. Macroblock 16 in second video object plane 12 is composed of four 8x8 blocks 22, 23, 24, 25. Each of the four blocks has its own motion vector. The location of block 22 in first video object plane 10 is encoded by motion vector 26, which is a vector of the motion of block 22' from video object plane 10 to block 22 video object plane 12. Blocks 22', 22 contain the same image, or are close (best-match) images that differ by an error term that is encoded with motion vector 26.

Likewise, motion vector 27 describes the movement of block 23' in first video object plane 10 to block 23 in second video object plane 12. Motion vectors 28, 29 quantify the motion of blocks 24', 25' in first video object plane 10 to blocks 24, 25 in second video object plane 12, respectively.

As can be seen in this example, although blocks 22, 23, 24, 25 are adjacent to each other in second video object plane 12, their best-match blocks 22', 23', 24', 25' are somewhat separated from each other in first video object plane 10. This is due to movement of images from one frame to another in the video sequence.

However, one block has moved much more than the other three. Block 22' is far apart from the other three blocks 23', 24', 25' in first video object plane 10, even though they are adjacent to each other in second video object plane 12. While this large movement could be an intentional part of the video, more likely it is an error. Especially for high-speed videos, which have more than 2 frames per second, the relative movement of blocks should be small.

Motion vector 26 for blocks 22, 22' is much larger than motion vectors 27, 28, 29. In FIG. 5, it appears to be more than double the size of the other three motion vectors. The inventor uses this abnormally large motion vector to signal a bitstream error.

Figure 6:
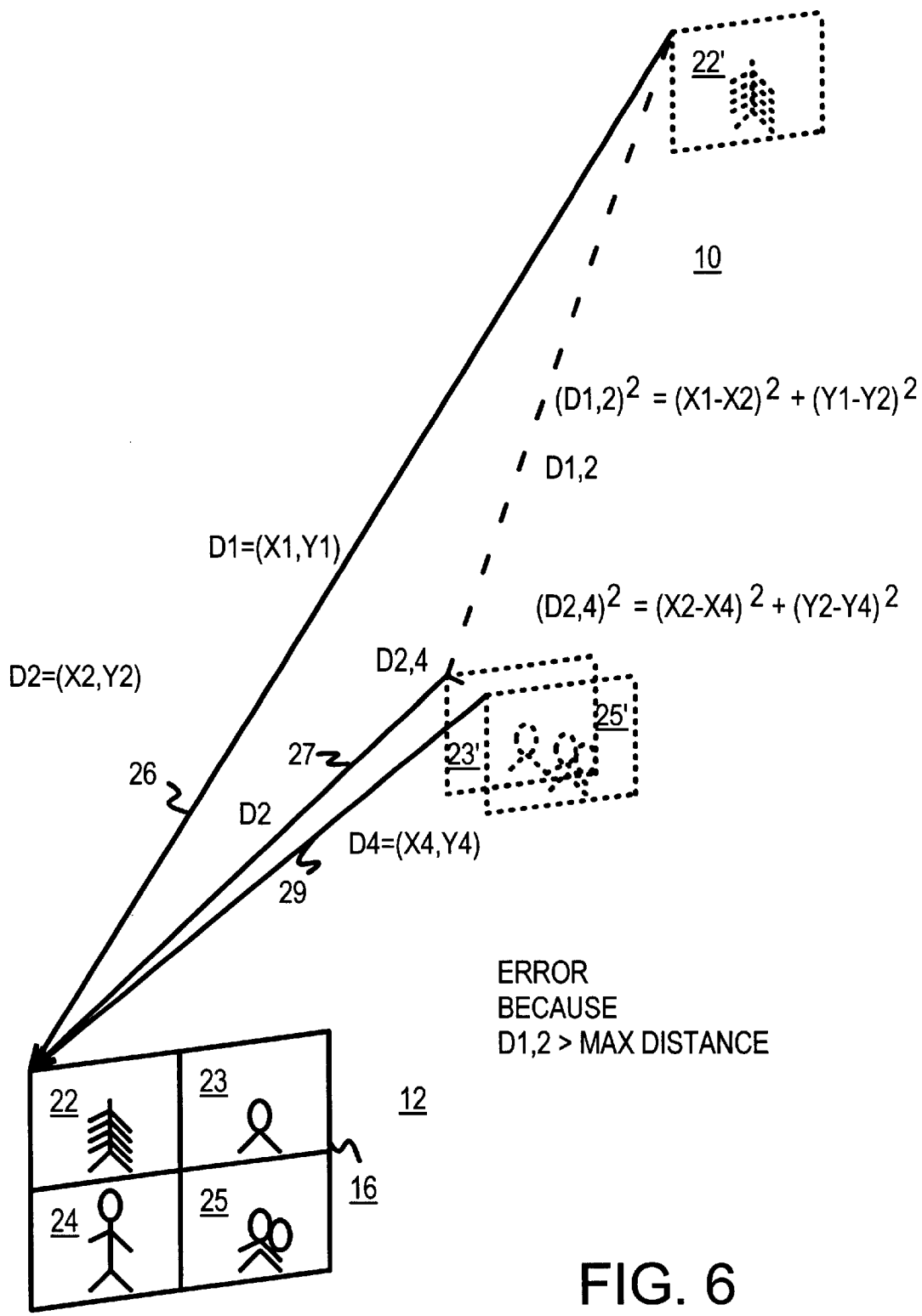
FIG. 6 highlights calculating distances among motion vectors for error detection.

FIG. 6 highlights calculating distances among motion vectors for error detection. Each motion vector can be expressed as an x,y value. Motion vector 26 is thus expressed as D1=(X1,Y1). The values X1 and Y1 can be encoded into the bitstream and extracted by the decoder. Since each motion vector is a distance or relative amount of movement, when comparing motion vectors to one another a common origin can be used. In FIG. 6 the motion vectors are thus shifted so that they have a common origin.

A triangle is formed between any two motion vectors. For example, motion vectors 26, 27 form a triangle with one side being motion vector 26, another side being motion vector 27, and a third side labeled D1,2. Another triangle is formed by motion vectors 27, 29 and a smaller side labeled D2,4.

The third side of each triangle is the distance between the two motion vectors forming the triangle. For example, the distance between motion vectors 26, 27 is side D1,2, while the distance between motion vectors 27, 29 is side D2,4.

The length of the third size of a right triangle can be determined using the Pythagorean Theorem, $a^2+b^2=c^2$, where a, b, and c are the lengths of the three sides of a right triangle. The x and y coordinates of each motion vector are the lengths of horizontal and vertical sides of a right triangle having the motion vector as the hypotenuse. Differences in x and y coordinates of two motion vectors also form vertical and horizontal sides of a right triangle having the difference side as the hypotenuse. The distance of the side between two motion vectors can thus be calculated as the Euclid distance between the two motion vectors.

The third side D1,2 between motion vectors 26, 27 is the Euclid distance D1,2:

$$(D1,2)^2=(X1-X2)^2+(Y1-Y2)^2$$

Likewise, the third side D2,4 is the distance between motion vectors 27, 29, or its Euclid distance:

$$(D2,4)^2=(X2-X4)^2+(Y2-Y4)^2$$

where X2,Y2 are stored coordinates for motion vector 27, and X4,Y4 is stored as motion vector 29.

As can be seen in FIG. 6, the distance D2,4 between motion vectors 27, 29 is quite small, since blocks 23', 25' for these motion vectors are close to each other and have not moved significantly relative to one another. However, distance D1,2 is much larger, since block 22' has moved from being significantly apart from blocks 23', 25'. Motion vector 26 is much larger than motion vectors 27, 29, and this is reflected in the large Euclid distance for D1,2.

When the maximum Euclid distance among all pairs of motion vectors within a macroblock is very large, an error is signaled. For example, an error can be signaled when the distance squared is more than 300, which is a movement of about 17 pixels in one frame.

For example, a macroblock has the motion vectors:

$$V1=(10, -4)$$

$$V2=(11, -5)$$

$$V3=(13, -3)$$

$$V4=(9, -6)$$

for the four blocks in the macroblock. The square of the Euclid distance between each possible pair of motion vectors is:

$$D(V1, V2)^2=(10-11)^2+(-4+5)^2=2$$

$$D(V1, V3)^2=(10-13)^2+(-4+3)^2=10$$

$$D(V1, V4)^2=(10-9)^2+(-4+6)^2=5$$

$$D(V2, V3)^2=(11-13)^2+(-5+3)^2=8$$

$$D(V2, V4)^2=(11-9)^2+(-5+6)^2=5$$

$$D(V3, V4)^2=(13-9)^2+(-3+6)^2=25$$

The maximum is found for D(V3,V4). Motion vector V3 is most likely to have an error, since all distances with V3 are larger (10, 8, 25) than the others (2, 5, 5).

The maximum squared-distance, 25, is compared with the distance threshold, 300, to determine if an error should be signaled. Since 25 is less than the threshold, no error is signaled.

If the bitstream was corrupted so that motion vector V1 was much larger, V1=(100, 100), while the other motion vectors were the same, then the squared distances are:

$$D(V1, V2)^2=(100-11)^2+(100+5)^2=11025$$

$$D(V1, V3)^2=(100-13)^2+(100+3)^2=18178$$

$$D(V1, V4)^2=(100-9)^2+(100+6)^2=17797$$

$$D(V2, V3)^2=(11-13)^2+(-5+3)^2=8$$

$$D(V2, V4)^2=(11-9)^2+(-5+6)^2=5$$

$$D(V3, V4)^2=(13-9)^2+(-3+6)^2=25$$

The maximum squared distance is 17797, which is much larger than the threshold of 300, so an error is signaled.

Although the actual Euclid distances could be calculated, the squares of the distances can also be compared to a squared threshold as in this example. A complex calculation step is saved, since the final square root for each distance does not have to be calculated.

Figure 7:
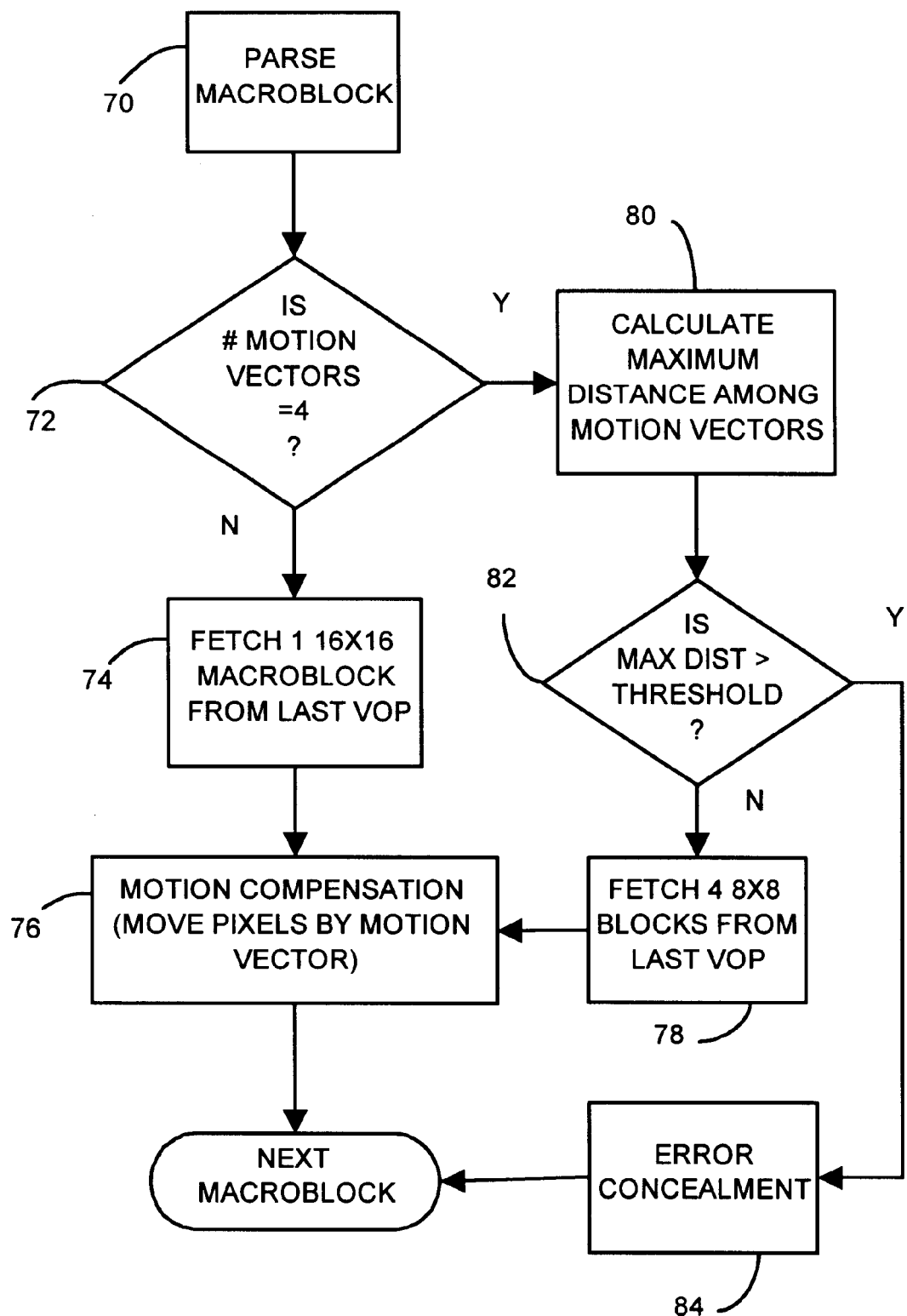
FIG. 7 is a flowchart of error detection and motion compensation using a maximum-distance threshold for block motion vectors.

FIG. 7 is a flowchart of error detection and motion compensation using a maximum-distance threshold for block motion vectors. The bitstream is parsed by the decoder for macroblocks, step 70. The number of motion vectors is determined, step 72. Some macroblocks may have no motion vectors when all pixels in the block are included, but this is rare except for the first frame in a video scene. Processing of those macroblocks is not shown. When the macroblock has 1 or 4 motion vectors, motion compensation is attempted.

When only one motion vector is encoded for the macroblock, the four blocks in the macroblock are moved together as one larger 16×16 unit. The motion vector indicates where the macroblock was located in the previous video object plane. The pixels for the macroblock are then fetched from memory at the location in the previous video object plane, step 74. This location is the current location minus the motion vector, with the memory pointer adjusted to point to the previous video object plane. Note that the macroblock may be stored in another video object plane, such as an earlier frame in the sequence, or even a later video object plane when backward motion compensation is enabled.

The fetched pixels from the macroblock are placed in their relative locations within the current macroblock, step 76. This shifting of the pixel locations within a frame is known as motion compensation. Any error terms can also be factored in by adjusting pixels within the macroblock. The next macroblock can then be parsed and processed.

When the macroblock contains four motion vectors, step 72, then four separate motion compensation operations are performed on the macroblock's four blocks. The Euclid distances among the four motion vectors are calculated, and the maximum distance or squared-distance is selected, step 80. The maximum distance is compared to a maximum-distance threshold, step 82. When the maximum distance calculated exceeds the threshold, an error is signaled. Error concealment is attempted, step 84. Error can be concealed by using pixels from the previous video object plane for this macroblock. The error may also be concealed by using a motion vector of another block in the macroblock for the corrupted motion vector.

When the maximum calculated distance is below the threshold, no error is signaled. Instead, motion compensation is performed on each of the four 8×8 blocks in the macroblock. For each block, its motion vector is used as an offset to locate pixels in the previous video object plane that correspond to the block. These pixels at the location specified by the motion vector are fetched from memory and placed in the block's location for the current video object plane. Fetching is repeated for the other 3 blocks, using the other three motion vectors, step 72. The shift in the pixel locations for each block is motion compensation, step 76. Any error terms are used to adjust pixels. Parsing then continues with the next macroblock.

Figure 8:
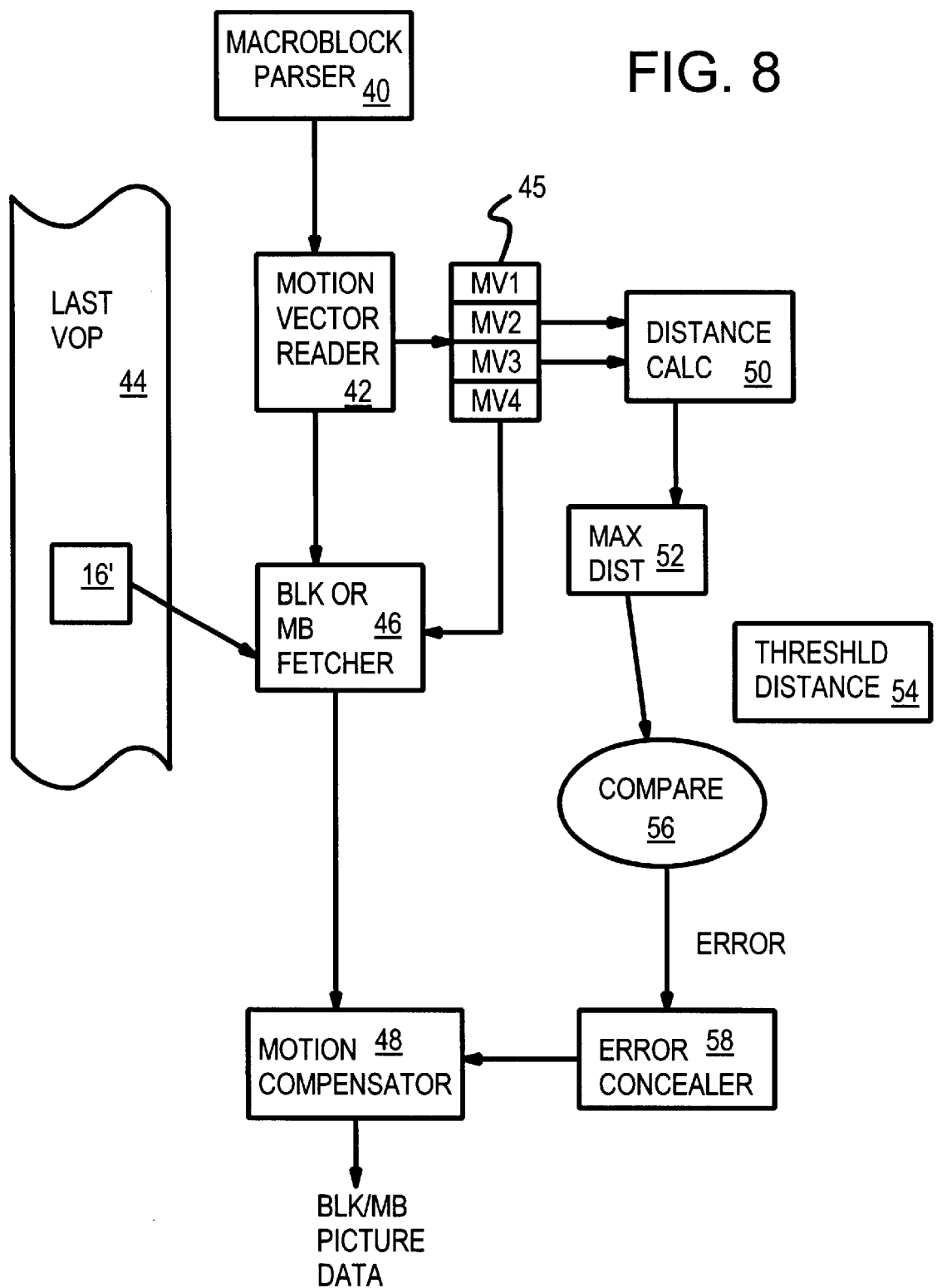
FIG. 8 is a diagram of an MPEG-4 decoder that detects corrupted bitstreams by comparing motion-vector distances to a threshold.

FIG. 8 is a diagram of an MPEG-4 decoder that detects corrupted bitstreams by comparing motion-vector distances to a threshold. Macroblock parser 40 receives part of a bitstream that may contain errors, such as a video bitstream transmitted over a wireless network. For each macroblock found, motion-vector reader 42 reads one or four motion vectors. The x and y coordinates or values for each motion vector are stored in registers 45. When only one motion vector is encoded for the macroblock, the motion vector is used by fetcher 46 to generate a memory address for reading macroblock 16' in memory 44, which contains pixel data for the last video object plane.

Motion compensator 48 then loads the pixels read from memory 44 into the location for the current macroblock. Since the location within the video object plane of the pixels in memory 44 differ by the motion vector, motion compensation is performed. The macroblock picture data is thus written to a memory buffer for the current video object plane.

When four motion vectors are decoded from the bitstream by motion vector reader 42, the four motion vectors are loaded into registers 45. These motion vectors correspond to the movement of each of the four 8×8 blocks within the current 16×16 macroblock.

Distance calculator 50 reads a pair of motion vectors from registers 45 and calculated the Euclid distance between the two vectors. The first distance calculated for a macroblock is written to maximum-distance register 52. Distance calculator then reads a different pair of motion vectors in registers 45, and calculates the Euclid distance between them. If the new distance calculated is greater than the maximum distance in maximum-distance register 52, the new distance overwrites the smaller distance in maximum-distance register 52. Distance calculator 50 continues reading pairs of motion vectors from registers 45 until all 6 possible pairs have been read and their Euclid distances calculated.

Once all 6 pairs of the four motion vectors in registers 45 have their distances calculated, maximum-distance register 52 will contain the largest of these distances, the maximum distance. Comparator 56 receives the maximum distance from maximum-distance register 52 and compares it to the threshold distance from threshold register 54. When the maximum distance exceeds the threshold distance, an error is signaled.

The error signal from comparator 56 activates error concealer 58. Error concealer 58 tries to estimate the corrupted motion vector using a neighboring block or macroblock's motion vector to conceal the error in the current macroblock.

When no error is signaled by comparator 56, fetcher 46 reads four blocks from memory 44 using the four motion vectors from registers 45. The four blocks can be located in different macroblocks in the previous video object plane stored in memory 44, so four different memory accesses may be required to fetch the four blocks.

The four 8×8 blocks fetched from memory 44 by fetcher 46 are then arranged into the current macroblock by motion compensator 48. Motion compensator 48 loads each block into one of the four block locations in the current macroblock's buffer for display in the current video object plane.

Distance calculator 50 and comparator 56 can operate in parallel with fetcher 46, allowing memory 44 to be accessed to read the pixel data pointed to by the motion vectors. If an error is later signaled by comparator 56, then motion compensator 48 can be instructed to discard the pixels fetched by fetcher 46.

Alternate Embodiments

Several other embodiments are contemplated by the inventors. For example the calculation steps such as the distance calculation can be performed by dedicated hardware or by a programmable engine such as a digital-signal processor (DSP) or microprocessor. Rather than use separate hardware registers, a portion of a larger memory can be set aside as the motion-vector and maximum-distance registers. Other registers can be added as pipeline latches of FIFO buffers.

Other distance formulas can be substituted for the Euclid distance, even though these formulas may not exactly calculate the true distance between motion vectors. For example, the squares of the distances can be calculated and compared, as described earlier. The absolute values of the differences in X and Y coordinates could be used instead of the squares of the distances, or the ratio of the maximum distance to the minimum distance could be compared to some threshold value.

Different sizes of macroblocks and blocks could be substituted. The number of blocks per macroblock could be varied, such as having 16 blocks for each macroblock, which might be a larger macroblock. The size of the macroblock could vary and be determined by headers for the video object planes or by a bitstream configuration. More complex logic could be used to more precisely localize the error detected by the motion vectors, such as by indicating which motion vector or vectors are causing the distances to be over-threshold. Error concealment could then be directed to conceal a more localized error on block rather than the whole macroblock or video object plane.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means"is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An error detector for a video bitstream comprising:
   a macroblock parser for locating macroblock data in the video bitstream for a current macroblock;
   a motion vector reader, coupled to the macroblock parser, for outputting a plurality of block motion vectors for a plurality of blocks within the current macroblock when the current macroblock is encoded as the plurality of blocks;
   a calculation unit, receiving the plurality of block motion vectors from the motion vector reader, for performing a predetermined function on pairs of block motion vectors in the plurality of block motion vectors to generate a function result for each of the pairs of block motion vectors; and
   a comparator, receiving the function result from the calculation unit, for comparing the function result to a predetermined threshold, the comparator signaling an error when the function result for any of the pairs of block motion vectors exceeds the predetermined threshold,
   whereby pairs of block motion vectors for blocks within the macroblock are operated on by the predetermined function and compared to the predetermined threshold to detect the error.

2. The error detector of claim 1 wherein when the current macroblock is encoded as smaller blocks, the current macroblock is divided into 4 blocks and the motion vector reader outputs 4 block motion vectors, the calculation unit operating on 6 pairs of the 4 block motion vectors;
   wherein when the current macroblock is encoded as a single macroblock a single macroblock motion vector is output by the motion vector reader and the calculation unit and comparator are disabled for detecting the error,
   whereby errors are detected for block motion vectors but not for macroblock motion vectors.

3. The error detector of claim 2 wherein the current macroblock is a 16×16 pixel square in a video object plane;
   wherein each block is an 8×8 pixel block within the current macroblock;
   wherein each block motion vector indicates a relative location of the 8×8 pixel block in a previous video object plane;
   wherein the macroblock motion vector indicates a relative location of the 16×16 pixel square in the previous video object plane;
   wherein the current macroblock is encoded by either the single macroblock motion vector or by 4 block motion vectors without the pixels when compression occurs.

4. The error detector of claim 3 wherein the video bitstream is an motion-picture-experts group (MPEG) encoded bitstream.

5. The error detector of claim 4 wherein the video bitstream contains errors caused by transmission over a wireless network.

6. The error detector of claim 1 wherein the current macroblock also includes an error term indicating changed pixels in the current macroblock from the pixels stored for a previous video object plane located by a motion vector.

7. The error detector of claim 1 wherein the predetermined function is a Euclid distance between a pair of block motion vectors, or a square of the Euclid distance, or an absolute-value difference of coordinates of block motion vectors.

8. The error detector of claim 1 wherein the calculation unit calculates a difference for each coordinate of the pair of block motion vectors, the calculation unit also calculating a square of the difference, the calculation unit summing the squares of the differences to generate the function result of the predetermined function.

9. The error detector of claim 1 wherein the predetermined threshold is a maximum distance between two block motion vectors in a pair of block motion vectors,
   whereby distances between pairs of block motion vectors are compared to a maximum distance to detect bitstream errors.

10. The error detector of claim 1 further comprising:
    a pixel fetcher, receiving the macroblock motion vector or the block motion vectors from the motion vector reader, for accessing a memory storing pixels in a previous video object plane using the macroblock motion vector as a pointer to a relative location of pixels for the current macroblock in the memory, or using each of the block motion vectors to locate pixels for each block in the previous video object plane,
    whereby pixels are fetched from the previous video object plane.

11. The error detector of claim 1 further comprising:
    an error concealer, activated by the error signal from the comparator, for concealing detected errors in the current macroblock.

12. The error detector of claim 11 wherein the error concealer substitutes another of the block motion vectors in the current macroblock for a block motion vector causing the error.

13. A method for detecting errors in a current macroblock in a compressed video bitstream comprising:
    parsing a compressed-video bitstream;
    for a current macroblock in a current video object plane:
        determining a number of motion vectors that encode the current macroblock;
    when only one motion vector encodes the current macroblock:
        using the only one motion vector to generate an address to access a memory;
        reading pixels from the memory for the current macroblock;
        moving a location of the pixels read from the memory to a location for the current macroblock in the current video object plane;
    when multiple motion vectors encode the current macroblock:
        executing a predetermined function on the multiple motion vectors to generate a result value;
        comparing the result value to a threshold;
        signaling a macroblock error when the result value meets error criteria indicated by the threshold;
        when the macroblock error is not signaled, using the multiple motion vectors to generate the address to access the memory and reading pixels from the memory for the current macroblock; and
        moving a location of the pixels read from the memory to a location for the current macroblock in the current video object plane,
    whereby the macroblock error is detected by executing the predetermined function on the multiple motion vectors for the current macroblock and threshold comparison.

14. The method of claim 13 wherein executing the predetermined function comprises:
calculating a distance among pairs of motion vectors in the current macroblock;
wherein the threshold indicates a maximum allowed distance among motion vectors in a macroblock.

15. The method of claim 14 wherein executing the predetermined function comprises:
calculating a square of a distance for each pair of motion vectors in the current macroblock;
storing a maximum square of the distance for all pairs as the result value.

16. The method of claim 14 wherein executing the predetermined function comprises:
calculating a square of a distance for each pair of motion vectors in the current macroblock;
wherein comparing the result value to the threshold comprises comparing each square of the distance for each pair of motion vectors to the threshold.

17. The method of claim 16 wherein the multiple motion vectors comprise 4 motion vectors for 4 blocks within the current macroblock, the 4 motion vectors indicating movement of pixels in the blocks.

18. The method of claim 17 wherein using the multiple motion vectors to generate the address to access the memory and reading pixels from the memory for the current macroblock comprises:
reading the memory for a block of pixels for each motion vector in the multiple motion vectors,
wherein blocks in a previous video object plane can be located in different macroblocks, but are in a same current macroblock in the current video object plane,
whereby blocks can move independently of macroblocks.

19. An error-detecting motion-picture-experts group (MPEG) decoder comprising:
motion-vector means for reading four motion vectors for four blocks in a current macroblock;
function means for operating on pairs of the four motion vectors to generate a result;
threshold means for comparing the result to a threshold;
error signaling means for signaling an error when the result exceeds the threshold;
pixel fetching means for reading pixels from a memory storing pixels in a previous video object plane using the four motion vectors to generate four addresses for four blocks in the previous video object plane containing pixels for the four blocks in the current video object plane;
arranging means for storing the pixels for the four block in the memory for the current video object plane,
whereby the error is signaled when the four motion vectors for the current macroblock cause the threshold to be exceeded.

20. The error-detecting MPEG decoder of claim 19 wherein the function means calculates a distance while the threshold is a maximum distance.

* * * * *